Figure 1:
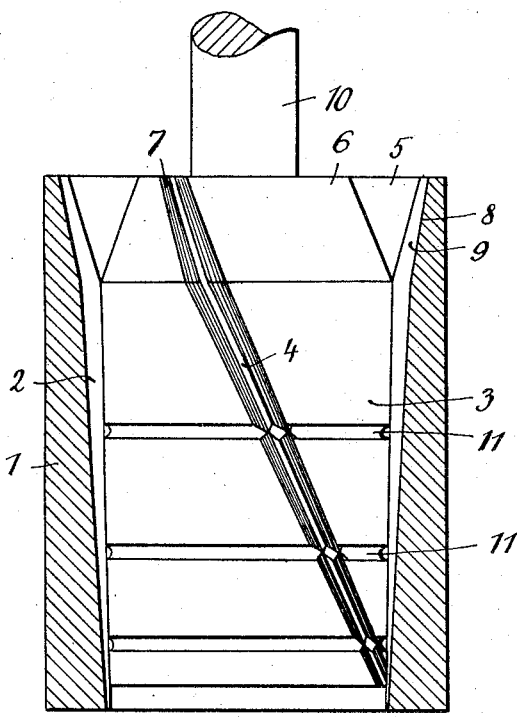

K. S. STENBO.
GRINDING MILL FOR COFFEE.
APPLICATION FILED APR. 25, 1919.

1,340,635.

Patented May 18, 1920.

INVENTOR:
Kristen Severin Stenbo
BY Wm Wallace White
ATTY.

UNITED STATES PATENT OFFICE.

KRISTEN SEVERIN STENBO, OF COPENHAGEN, DENMARK.

GRINDING-MILL FOR COFFEE.

1,340,635.   Specification of Letters Patent.   Patented May 18, 1920.

Application filed April 25, 1919. Serial No. 292,682.

*To all whom it may concern:*

Be it known that I, KRISTEN SEVERIN STENBO, metal ware manufacturer, a subject of the King of Denmark, residing at Copenhagen, in the Kingdom of Denmark, have invented new and useful Improvements in Grinding-Mills for Coffee, of which the following is a specification.

The present invention relates to a grinding-mill for coffee. In the heretofore used grinding-mills of steel with conical grinding members, the material is supplied at the narrow end of the grinding members, where the recesses between the teeth or ribs of the grinding members are deeper, while their depth decreases toward the wide end of the grinding members. The number of grinding teeth (ribs) is smaller at the narrow end of the grinding members than at the wide end.

It has been proved that the contents of extract in the coffee are better utilized the finer the coffee is ground. In the heretofore used grinding mills, it has been attempted to increase the fineness of grinding by making the recesses between the teeth or ribs as shallow as possible. Hereby appears the drawback, however, that the very shallow teeth or ribs quickly become worn out.

This drawback is avoided in the present invention having for its object to provide a grinding-mill having grinding-teeth or ribs covering the grinding surfaces completely and having in the outer grinding member as well as in the inner one, the same number of ribs where the tooth recesses are deepest as where they are shallowest. The grinding teeth or ribs cover the grinding surfaces completely. At their widest end, facing the supply-opening for the material, the grinding members are shaped in such a manner, by expansion of the outer grinding member and contraction of the inner one that there is produced, between them, a hopper-shaped space fitted with grinding ribs. The teeth or ribs of one or both grinding members are interrupted by one or more annular grooves.

Hereby the result is attained that the material is subjected to efficient treatment between the grinding surfaces, especially also on the portion thereof where the recesses between the teeth or ribs are deep, so that it may be ground to the necessary degree of fineness, even if the minimum depth of recess between the teeth or ribs be relatively large. This result is further enhanced by the grinding teeth being interrupted by the cross-grooves whereby it is avoided, during grinding, to have the ground coffee passing constantly through the same recess between the teeth or ribs, the coffee being now distributed, by means of the cross-grooves, to other parts of the grinding surfaces, so that the degree of fineness desired for the finished product is hereby not solely determined by the depth of the recess between the teeth or ribs.

By way of example, one manner of constructing the invention is shown on the drawing, where—

Figure 1 shows a vertical longitudinal section of a grinding mill, and

Figure 2:
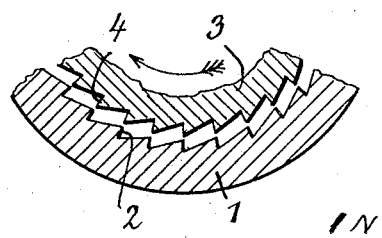

Fig. 2 a horizontal section through parts of the grinding members.

1 is the outer stationary grinding member fitted with grinding ribs 2 disposed longitudinally on the grinding member or along steep helical lines. 3 is the interior grinding member with grinding ribs 4 shaped as helices having a smaller pitch than the grinding ribs 2. For the sake of clearness, there is shown in Fig. 1 only one grinding rib 4 and one recess, but the grinding ribs cover the entire grinding surface. The interior surface of the grinding member 1 and the exterior surface of the grinding member 3, which surfaces form the grinding surfaces, are slightly conical with their wider end facing the supply-opening 5 for the material. In this opening, the interior grinding member 3 has a conical recessed portion 6 with grinding ribs 7 forming extensions of the ordinary grinding ribs 4. The grinding member 1 is also fitted, at top, with a conical extended piece 8 with grinding ribs 9 forming extensions of the grinding ribs 2. 10 is the shaft which may be turned either by hand or engine-power.

The recesses between the grinding ribs 4 as well as 2 are deepest where the grinding surfaces, preferably touching one another, have their largest diameter, and are shallowest where the grinding surfaces have their smallest diameter.

11 are annular endless grooves in the grinding members 1 and 3.

In the construction shown, the mill is shown in vertical position, but there is obviously nothing to prevent the use, in horizontal grinding-mills, of grinding members of the kind here specified.

Having now particularly described and ascertained the nature of my said invention and in what manner the same is to be performed, I declare that what I claim is:—

In a grinding mill for coffee comprising an outer and an inner grinding member with grinding teeth or ribs, the number of grinding teeth or ribs in the said grinding members being equal both where the recesses between the teeth or ribs are deepest and where they are shallowest, the said grinding teeth or ribs on both of the said grinding members covering the grinding surfaces entirely, one or more annular endless grooves in one or both of the grinding members, the said grooves intersecting the teeth or ribs of the grinding members.

In testimony whereof I have signed my name to this specification.

KRISTEN SEVERIN STENBO.

Witnesses:
F. ENGELHARDT MADSEN,
V. BELSELMER.